(No Model.)
V. DI MARZO.
SELF REGULATING LAMP.
No. 418,114. Patented Dec. 24, 1889.
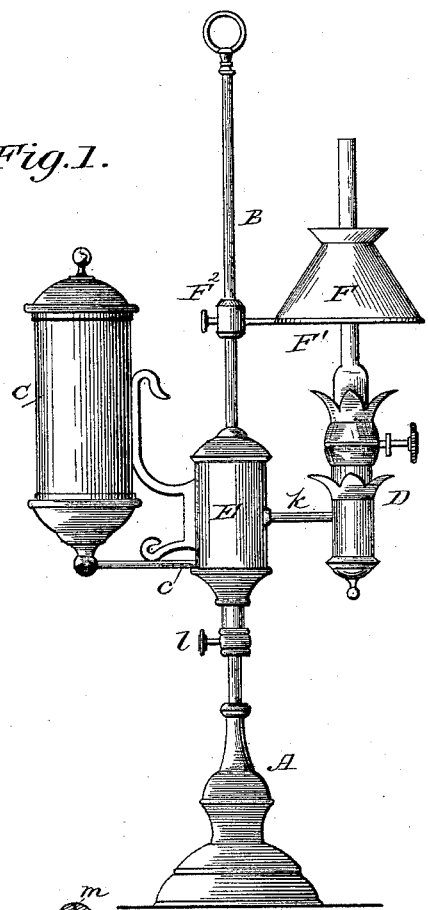
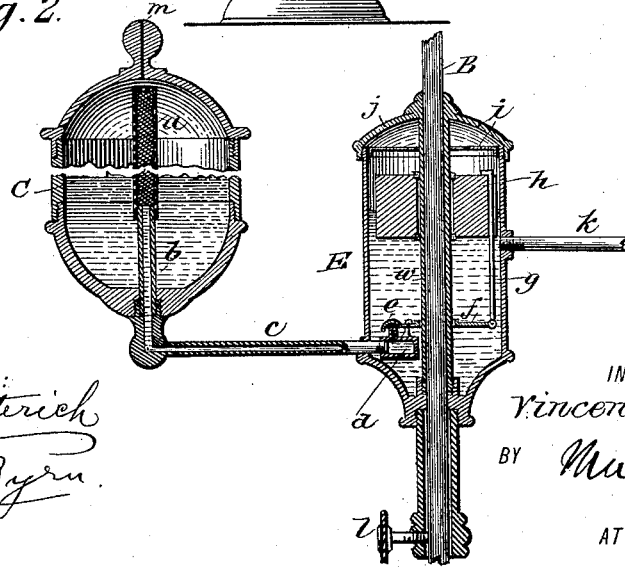
WITNESSES:
Fred G. Dieterich
Edw. W. Byrn
INVENTOR
Vincent Di Marzo
BY Munn
ATTORNEY

UNITED STATES PATENT OFFICE.

VINCENT DI MARZO, OF LOUISVILLE, KENTUCKY.

SELF-REGULATING LAMP.

SPECIFICATION forming part of Letters Patent No. 418,114, dated December 24, 1889.

Application filed August 14, 1889. Serial No. 320,772. (No model.)

*To all whom it may concern:*

Be it known that I, VINCENT DI MARZO, of Louisville, in the county of Jefferson and State of Kentucky, have invented a new and useful Improvement in Self-Regulating Lamps, of which the following is a specification.

My invention relates to self-regulating lamps, and especially to that form of lamp known as the "German student-lamp," which has a base with a vertical stem, which carries a reservoir on one side and a burner and chimney on the other, which are vertically adjustable on the vertical stem.

My improvement consists in the peculiar construction and arrangement of the regulating devices for the oil, which are contained in an intermediate portion of the lamp, which slides on the stem, as hereinafter fully described.

Figure 1 is a side elevation of the lamp, and Fig. 2 is a vertical central section of the reservoir on a larger scale.

In the drawings, A represents the base of the lamp, which is provided with a vertical stem B, upon which slides the lamp proper, consisting of reservoir C and burner D. The cap of the reservoir is made detachable to permit the reservoir to be filled, and through the cap is formed a small hole $m$, Fig. 2, to permit air to gain access to the reservoir to allow the oil to pass freely out of the same.

E is the regulator-chamber, and $c$ is a small pipe connecting the oil-reservoir with the same. To prevent sediment from passing through this pipe into the regulator, the pipe $c$ is continued some distance up in the reservoir at $b$, and the end is covered by a wire-gauze extension $a$. The middle part E of the lamp forms the regulator, and to it the oil is fed from the reservoir through pipe $c$, and from said regulator the oil is fed to the burner through the pipe $k$. The regulator-chamber has an inner wall $w$, which forms a tubular passage-way for the vertical stem B, and is adjusted vertically to different heights by a set-screw $l$, which passes through a sleeve attached to the regulator and binds against the stem. In the bottom of the regulator-chamber E there is disposed the end $d$ of the supply-pipe, which connects directly with the inlet oil-pipe $c$. On the upper side of this supply-pipe there is a nipple-shaped opening $e$, which is opened or closed by a valve on the end of lever $f$, fulcrumed near the nipple. In the chamber E and surrounding the central tube $w$ is a float $h$, which is connected by a rod $g$ to the lever $f$. This float is maintained at a height dependent upon the level of the oil in the regulator, and this level is so adjusted as to be a little below the level of the burner of the lamp. When the level of the oil falls below this point, the descent of the float opens the valve $e$ and admits oil from the reservoir to the regulator, and when the oil rises to its normal level again the ascent of the float closes the valve $e$ and cuts off further supply from the reservoir. In this way the flow of oil from the reservoir to the lamp is regulated automatically.

F is the lamp-shade, which is sustained upon a rim $F'$, attached to a sleeve $F^2$, sliding on the central stem, and has a vertical adjustment thereon by means of a set-screw.

Having thus described my invention, what I claim as new is—

1. The combination, with a base having a vertical stem, of a lamp consisting of a reservoir located upon one side, a burner located upon the opposite side, and a central regulator-chamber having an opening through it to receive the vertical stem, the said central chamber being provided with a float and valve for the automatic regulation of the flow of oil from the reservoir to the burner, as described.

2. The combination, with a base having a vertical stem, of a lamp consisting of a reservoir located upon one side, a burner located upon the other side, a central regulator-chamber having an opening through it to receive the vertical stem and communicating with the burner, a supply-pipe in the bottom of the regulator-chamber communicating with the reservoir, and a valve $e$, lever $f$, rod $g$, and float $h$, substantially as shown and described.

3. A lamp of the class known as the "German student-lamp," having a vertical standard, an adjustable part mounted on the said standard, and consisting of a reservoir on one side, a burner on the other, and a vertically-elongated chamber between having a vertical opening through it to receive the standard and containing an automatic regulating-valve, substantially as shown and described.

The above specification of my invention signed by me in the presence of two subscribing witnesses.

VINCENT DI MARZO.

Witnesses:
GEO. H. ALEXANDER,
EDW. W. BYRN.